Figure 1:
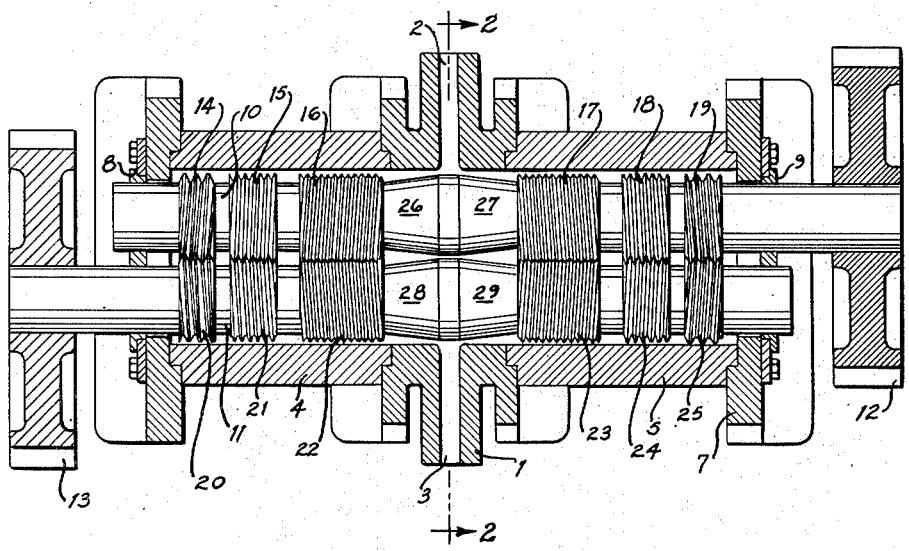

Dec. 26, 1950

G. A. PONCELET 2,535,865

EXTRUSION PRESS

Filed Dec. 30, 1947

INVENTOR.
GAETAN A. PONCELET
BY Thomas R. O'Malley
Attorney

Patented Dec. 26, 1950

2,535,865

UNITED STATES PATENT OFFICE 2,535,865

EXTRUSION PRESS

Gaëtan Antoine Poncelet, Brussels-Ixelles, Belgium, assignor to Geoffroy Charles Gustave Klein Weert, Netherlands Application December 30, 1947, Serial No. 794,486
In Belgium December 21, 1946

5 Claims. (Cl. 18—12)

Many extrusion presses with one or more pairs of threaded spindles which are used for manufacturing articles of small or large section must be able to resist forces of the order of 100 tons. Pressures of this order are usually sustained by a plurality of thrust bearings which are located in the very limited space defined by the small distance between the threaded spindles. Some of these thrust bearings contain ten or fifteen collars in order to reduce the surface pressure.

The known extrusion presses with one or more pairs of screw or threaded spindles have the following disadvantages:

1. The small diameter available for collars of thrust bearings which is restricted by the distance between the screw spindles, 2. The small diameter of the addendum-circle of the driving gears of the spindles which is also limited by the distance between the spindles, and 3. The necessity of making the housing strong enough to withstand the strong pressures exerted.

The present invention relates to an extrusion press with two or more screw spindles for treating soft or hard plastic substances.

A purpose of the invention is to entirely compensate the axial forces, irrespective of their order of magnitude, without the use of thrust bearings or abutments.

A further purpose of the invention is to devise the spindles in such a way that the pressure of the substance treated by the press increases towards the discharge orifice or orifices.

Another purpose of the invention is to design the press in such a way that the diameters of the driving gears of the spindles are in no way limited by the distance between the spindles.

According to a feature of the invention the screw spindles have intermeshing threads, each of the spindles being provided with one or more left-hand threaded portions and one or more right-hand threaded portions.

According to a further feature of the invention the extrusion press comprises a housing with one or more supply orifices for the materials to be treated and one or more discharge orifices for the treated materials, two or more screw spindles being rotatably mounted in said housing, the shape of said spindles being such that the area of the space between the spindles and the housing decreases towards the discharge orifice or orifices.

According to still further features of the invention two mutually engaging screw spindles have their driving ends at opposite sides of the housing, said driving ends being provided with driving gears.

Because each of the spindles is provided with left-hand and right-hand threaded portions the axial forces working on a spindle are equal and of opposite direction so that there is no resultant axial force and thrust bearings are superfluous.

By fitting the driving gears of two engaging spindles at different ends of the housing each of said gears is not obstructed by the other spindle so that these gears may be adequately dimensioned to drive the spindles which act on the materials with forces of 50 to 100 tons and the materials may be subjected to pressures of the order of 20,000 lbs./sq. in.

With the extrusion press according to the invention it is possible to treat all thermoplastic and thermosetting materials in order to manufacture soft or hard products.

The press has an automatic control of the pressure as a function of the speed of rotation in order to remove the drawbacks which would be the result of treating materials of varying hardness. These might cause a fracture of the parts of the machine and may also result in a lack of homogeneity of the product as a result of variations of the pressure.

Figure 2:
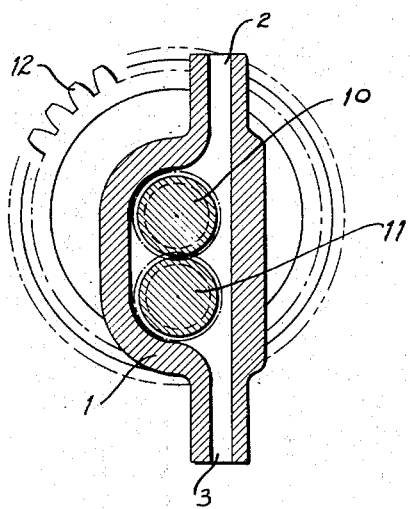

In order to elucidate the invention reference is made to the accompanying drawing which shows by way of example an extrusion press according to the invention. In this drawing:

Fig. 1 is a horizontal section of the housing with a plan view of the screw spindles and Fig. 2 is a vertical section taken along line II—II in Fig. 1.

The housing of the press comprises a centre part 1 provided with two discharge orifices 2 and 3, two parts 4 and 5 and two end plates 6 and 7. The end plates 6 and 7 or the parts 4 and 5 of the housing are provided with supply-orifices, not shown in the drawing. The parts of the housing are held together by any suitable means.

Bearing plates 8 and 9 are fixed to the end plates 6 and 7 respectively, forming bearings for screw spindles 10 and 11. The driving end of the spindle 10 extends beyond the end plate 7 and beyond the right-hand end of the spindle 11 so far that a driving gear 12 of adequate dimensions may be secured on the driving end of the spindle 10. In the same way a driving gear 13 may be fixed to the driving end of the spindle 11.

The spindle 10 is provided with three threaded portions 14, 15 and 16 with left-hand thread and three portions 17, 18 and 19 with right-hand thread. In the same way the spindle 11 comprises three left-hand threaded portions 20, 21 and 22 and three right-hand threaded portions 23, 24 and 25. The threaded portions 14 to 19 of the spindle 10 engage the correspondingly threaded portions 20 to 25 of the spindle 11. The pitch of the screw threads of the threaded portions decreases from the outer ends of the spindles towards the centre part in order to increase the pressure of the materials in the direction of the discharge orifices 2 and 3. The centre part of the spindles 10 and 11 is formed with two opposed conical parts 26, 27 and 28, 29 respectively in order to reduce the space between the spindles and the housing in the direction of the discharge orifices, thereby increasing the pressure of the materials, which are treated by the press. The portions 26, 27, 28 and 29 may be provided with helical grooves in order to mix the materials more thoroughly.

The parts 4 and 5 of the housing may be heated in any suitable way and if desired an internal heating of the spindles 10 and 11 may be used at the same time.

The extrusion press works in the following way:

The materials to be treated are supplied through the supply-orifices to the spaces between the bearing plate 8 and the threaded portions 14 and 20 and between the bearing plate 9 and the threaded portions 19 and 25. Thereupon the materials are pressed towards the centre with a pressure which increases by the decrease of the pitches of the screws and finally the pressure is still further increased by the conical centre parts of the spindles. As each spindle is provided with left-handed and right-handed screws the axial forces are compensated, so that there is no resultant force in axial direction.

The screw spindles may be cleaned in a very simple way by removing the spindles from the housing which is possible because all screws have the same addendum-circles, so that the spindles may be retracted from the housing.

The material is extruded from the compression chamber formed by the centre-part 1 of the housing in tangential direction to the screw spindles. The internal heating of the spindles may be applied by electricity or in any other suitable way.

A special compound motor makes it possible to limit the pressure in the pressure chamber by decreasing the speed to a certain limit in order to prevent damaging of the parts of the press.

The embodiment shown in the drawing has two spindles. However, it is also possible to use two or more pairs of spindles which work at the same time. Although it is preferred to arrange the discharge orifices in the centre-part of the press, it is also possible to devise the machine in such a way that the material is supplied to the centre-part of the press and is driven towards both ends which in that case are provided with discharge orifices. The pitches of the screws must then decrease from the centre towards the end and the spindles are to be provided with conical parts near the end plates 6 and 7.

What I claim is:

1. An extrusion press comprising a housing, at least one pair of threaded spindles rotatably mounted in said housing, each spindle having at least one left-handed and at least one right-handed threaded portion, the threaded portions of one spindle of a pair meshing with the correspondingly located threaded portions of the other spindle of the same pair, at least one discharge aperture in the housing located in a plane between the left-handed and the right-handed threaded portions, and a non-threaded portion on each of the spindles between the left-handed and the right-handed threaded portions, a central compression chamber being formed between said non-threaded portions and the interior wall of the housing.

2. An extrusion press comprising a housing, at least one aperture in said housing, and at least one pair of threaded spindles rotatably mounted in said housing and each having left-handed and right-handed threaded portions, the threaded portions of one spindle of a pair meshing with the correspondingly located threaded portions of the other spindle of the same pair, the working chamber of said housing having an interior wall parallel to the axes of the spindles, and a non-threaded portion on each of said spindles located between the left-handed threaded portions and the right-handed threaded portions, said non-threaded portions having a cross-section which increases towards the discharge apertures located adjacent said non-threaded portions.

3. An extrusion press comprising a housing, at least one pair of threaded spindles rotatably mounted in said housing, each spindle having a plurality of left-handed and right-handed threaded portions, the threaded portions of one spindle of a pair meshing with the correspondingly located threaded portions of the other spindle of the same pair, means for driving said spindles, and at least one discharge aperture located in a plane between the left-handed and the right-handed threaded portions, each of the threaded portions being of uniform pitch and the pitches of the separate threaded portions being different and decreasing towards the discharge apertures, the spindles having non-threaded portions between the threaded portions of the same direction leaving compression chambers between said non-threaded portions and the interior wall of the housing.

4. An extrusion press comprising a housing, at least one discharge aperture in said housing, at least one pair of threaded spindles rotatably mounted in said housing and each having more than one left-handed and right-handed threaded portion, the pitches of the separate threaded portions being different and decreasing towards the discharge apertures, the threaded portions of one spindle of a pair meshing with the corresponding threaded portions of the other spindle of the same pair, and all threaded portions having equal addendum-circles.

5. An extrusion press comprising a housing and at least one pair of intermeshing threaded spindles rotatably mounted in said housing, one of the spindles of each pair having a driving gear wheel at one end which extends beyond the corresponding end of the other spindle of the same pair, the last-mentioned spindle having a driving gear wheel at the other end which extends beyond the corresponding end of the first mentioned spindle, the radii of said driving gear wheels being greater than the distance between the axes of said spindles.

GAËTAN ANTOINE PONCELET.

REFERENCES CITED

The following references are of record in the file of this patent:

UNITED STATES PATENTS

| Number | Name | Date |
|---|---|---|
| 840,298 | Carlson | Jan. 1, 1907 |
| 2,119,162 | Hartner | May 31, 1938 |
| 2,404,630 | Griffiths | July 23, 1946 |

FOREIGN PATENTS

| Number | Country | Date |
|---|---|---|
| 470,057 | Belgium | Jan. 1947 |